March 15, 1960 J. P. VINDING 2,928,999

SQUARE CURRENT WAVE GENERATOR FOR INDUCTIVE CIRCUITS

Filed April 1, 1957 2 Sheets-Sheet 1

INVENTOR.
JORGEN P. VINDING
BY
Lippincott & Smith
ATTORNEYS

INVENTOR.
JORGEN P. VINDING
BY
Lippincott & Smith
ATTORNEYS

United States Patent Office 2,928,999
Patented Mar. 15, 1960

2,928,999

SQUARE CURRENT WAVE GENERATOR FOR INDUCTIVE CIRCUITS

Jorgen P. Vinding, Los Gatos, Calif., assignor, by mesne assignments, to Monogram Precision Industries, Inc., Culver City, Calif., a corporation of California Application April 1, 1957, Serial No. 649,750

3 Claims. (Cl. 317—123)

This invention relates to means for developing currents of substantially rectangular or square waveforms in inductive circuits and particularly to means for producing such waveforms from voltage sources of only moderate value.

It is well known that in order to produce a perfectly rectangular or square waveform in an ideal inductance, without resistance or distributed capacity, it would require a voltage pulse of infinite amplitude and infinitesimally short duration at the beginning of each current pulse and an equal and opposite pulse of voltage at the end of each current pulse and the beginning of the following pulse of opposite sign. Since ideal inductances do not exist and infinite voltages of infinitely short duration are impossible of realization, what is meant by "square waveforms" in practice are in fact approximately trapezoidal, the time required for the current to change from one value to another being short in comparison with the time during which the current remains at the changed value. Even such approximations to square or rectangular waveforms ordinarily require very high voltages if the inductance is material and the rise-time of the current waves is to be short.

In the present specification the term "square waveform" will be used to designate waves wherein the positive and negative portions of the cycle are equal, in contradistinction to "rectangular waveforms" which have unequal positive and negative current or voltage swings. The present invention can be applied to generate waveforms of either type, but is primarily adapted to the generation of "square" waves.

It is relatively easy to develop voltage waves of substantially square waveform or current waves corresponding to such voltage waves in resistive circuits. In apparatus employing gyromagnetic effects, however, it is frequently necessary to induce sudden changes in the magnetic state of the ferrites or other gyromagnetic materials upon which such effects depend. For this reason it becomes necessary to develop currents of substantially square or rectangular waveform in the coils wherein polarizing fields are induced and which are, of course, inherently inductive; to develop such waveforms involves the problems referred to generally above.

The primary object of the present invention is to provide a means for developing square waveforms in an inductive circuit, deriving the power for so doing from a source of only moderate value in comparison with that which would be required if it were attempted to accomplish the same result by "brute force," to provide such a means which responds quite accurately to a square voltage wave, and to achieve the above result with relatively simple and inexpensive apparatus.

In simple terms, the invention employs the inductance through which it is desired to pass the square current wave as the first series element of a ladder network comprising a plurality of series inductors and shunt capacitors, so proportioned as to resonate to a plurality of integrally related frequencies, including the repetition frequency of the desired square current waves and the third and succeeding odd harmonics thereof. Only a limited number of such resonant frequencies are necessary. Although schematically such a network resembles an artificial transmission line or filter network it differs in fact because the load in which such networks usually terminate is omitted, the load in this case being an inherent part of the network itself, in fact, the first element. The end of the network remote from the power source is unterminated, and to the source the network looks like a parallel array of series-resonant circuits. This is fed by a source of the "constant-current" type, which is switched into and out of the circuit at the repetition frequency of the desired wave.

In the drawings, illustrative of description of a preferred form of the invention which follows.

Figures 1, 2:
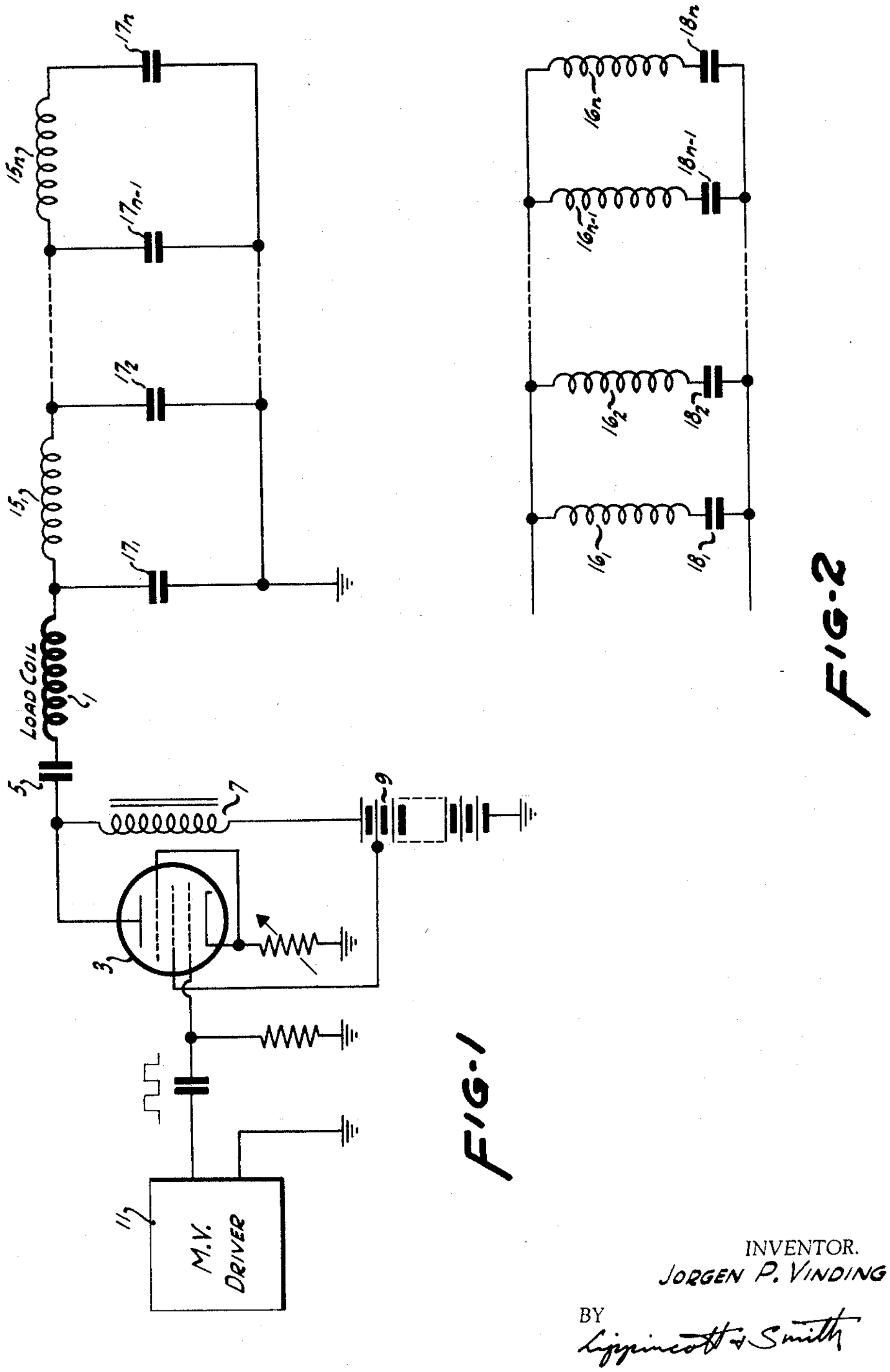
Fig. 1 is a simplified schematic diagram showing the essential elements of the present invention.
Fig. 2 is a schematic diagram of a network, from which the ladder network shown in Fig. 1 is derived.

In the drawing of Fig. 1 the inductor 1 represents the coil wherein it is desired to develop a square current wave. In the apparatus here described this coil has an inductance of 30 millihenrys and it is desired that it carry a substantially square-wave current having a peak-to-peak value of 100 milliamperes. This current is supplied through a pentode 3, the anode of which connects to the coil 1 through a large blocking condenser 5. The direct current supply for the tube is shown as being through an inductor 7, of large value in comparison with the load circuit, from a source 9. This source also supplies suitable operating voltage for the screen grid of the tube. Although shown, schematically, as a battery, the source will usually be a rectifier supply of conventional type and the inductor 7 could be replaced by a resistor with some loss of efficiency.

The particular tube used in the apparatus shown was one 6AQ5 tube. Its grid is driven from a multivibrator 11 that develops a square voltage wave of a desired frequency; in this case about 10 kc.

It is well known the dynamic impedance of a pentode is extremely high, usually of the order of a megohm. The output current of such a tube therefore depends upon the potentials of its control and screen grids and is substantially independent of the impedance in the plate circuit, up to the point where the anode potential falls to nearly the cathode potential. In driving an inductive load, however, the current in the load can only increase rapidly enough to make the induced counter E.M.F. approximately equal to the voltage delivered by the plate supply, since more rapid increase would reduce the anode potential below that of the cathode and cut off the tube entirely. It is to avoid this limitation on the rise of the tube current and still keep the required driving voltage within reasonable limits that the ladder network next to be described is used.

This network comprises a plurality of inductors $\mathbf{15}_2$ to $\mathbf{15}_n$ connected in series with the inductance 1, with shunt condensers $\mathbf{17}_1$ through $\mathbf{17}_n$ bridged to ground from each junction between the series inductors and from the terminus of inductor $\mathbf{15}_n$.

The impedance of this network is identical with that of a network such as is shown in Fig. 2, comprising an array of series-resonant circuits connected in parallel, the successive series-resonant circuits responding to successive odd harmonics of the repetition frequency of the desired square wave, including the first harmonic or fundamental frequency.

It is well known that a square wave can be resolved into (or synthesized from) a succession of the odd harmonics of the repetition frequency, extending theoretically, to the *n*th harmonic, where *n* equals infinity. A relatively good approximation of a square wave can be attained, however, with only a few odd harmonics. The rise-time of the resultant wave, from peak to peak, approximates one-half cycle of the highest harmonic used; e.g., if five are included the rise-time is approximately one-half cycle of the 11th harmonic. There will also be a small oscillation on the relatively flat top of the resultant wave, decreasing in amplitude and increasing in frequency as the order of the highest included harmonic is increased.

It is also well known that the impedance of an ideal series-resonant circuit is zero at its resonant frequency and that of a practically-attainable circuit can be made very small. If, therefore, a tube such as the tube 3 here shown, the current output whereof depends primarily on its control-grid voltage, feeds a network such as that of Fig. 2, its current output will approach very closely the theoretical form of a quasi-square wave containing the resonated harmonics.

For the present purposes this procedure would be futile; each of the inductors $16_1$ and $16_n$ and the condensers $18_1$ to $18_n$ of Fig. 2 carries, for all practical purposes, only a single harmonic component. Transformations are known, however, by which a ladder network of the type shown in Fig. 1 can be given the same impedance characteristics as that of Fig. 2. Since this is true and since the first inductive element of Fig. 1 must carry the entire output current of the tube, it remains only to derive a network wherein the load-inductor 1 is the first series element and the other inductors and capacitors have the proper values to give minimum impedance to the requisite number of harmonics. The number of inductors and condensers will each be equal to the number of harmonics present in the resulting waveform.

The mathematical procedure for deriving the network of Fig. 1 from that of Fig. 2 is somewhat complex. It is unnecessary that it be given here however, for it is readily available in the literature. For example, in "Pulse Generators," vol. 5, Radiation Laboratory Series, McGraw-Hill, 1948, there is shown the derivation of such a network at pages 189–203, and in Fig. 6.22, page 201, there is shown a network of the type of Fig. 1, with relative values of the elements of the network indicated, which only need be multiplied by the proper coefficients (as explained in the text) to be directly applicable to the present invention. It is to be noted, however, that as there discussed this network is described as "voltage fed" and is applied to generate pulses in an external load. In its present application the ladder network, although physically the same, is current-fed and is itself the load.

For the 10 kc. frequency here desired, the given value of 30 mh. of the driven coil is divided by the 0.0781 value of the first inductive element shown in the text, to arrive at the coefficient by which the succeeding inductor values must be multiplied to give the proper response; in this case the coefficient is 0.384 (the figure 0.0781 being in henrys) and the successive inductors $15_2$ to $15_5$ have inductances of 24.3, 25.2, 29.7 and 42 mh. respectively, to slide-rule accuracy.

As the referenced figure shows, the coefficient 0.384 is the product of the pulse-length times an impedance; the value of the capacities shown is multiplied by the same pulse-length divided by the same impedance. This leads to capacities, in mmf., of 421, 417, 459, 580 and 1093 for condensers $17_1$ to $17_5$, respectively. If more harmonics are to be included the complete formula given in the text may be used but the improvement in performance, for many purposes, is not worth the complication.

Other ladder networks are known having like impedance characteristics, certain of which are shown in the reference above cited, and in other works referred to therein. Any of these equivalent networks may be employd in the present invention provided its initial series element is an inductor which, in accordance with this invention, is the coil wherein the square-wave currents are required.

In practice the values of the inductances and capacitances used, when measured individually, will not conform exactly to those given in the above. The distributed capacities of the coils and other accidental and more or less indeterminate quantities enter into the performance of the circuit as a whole, so that means are provided for making any slight adjustments necessary to bring the resonant points to their most effective values; their range of adjustment can be very small. When so adjusted the waveform of the resulting wave is substantially that shown in Fig. 4, the calculated and observed forms being substantially identical.

Although apparatus may be designed wherein ferrite elements are polarized alternatively in two directions in order to accomplish their desired function it is easier from both the design and the operational view point to so proportion the apparatus in which they are used that in one critical condition no current flows through the polarizing coil. This permits one critical value—zero current—to be permanently set or built into the apparatus and requires only one critical current value to be adjusted in operation. In order to effect this situation and still use the principles of the invention that has been described the arrangement shown in Fig. 3 may be employed. In this figure the current source for the tube and coil 1 is omitted; the elements having direct counterparts in the diagram of Fig. 1 are identified by the same reference characters.

Figure 3:
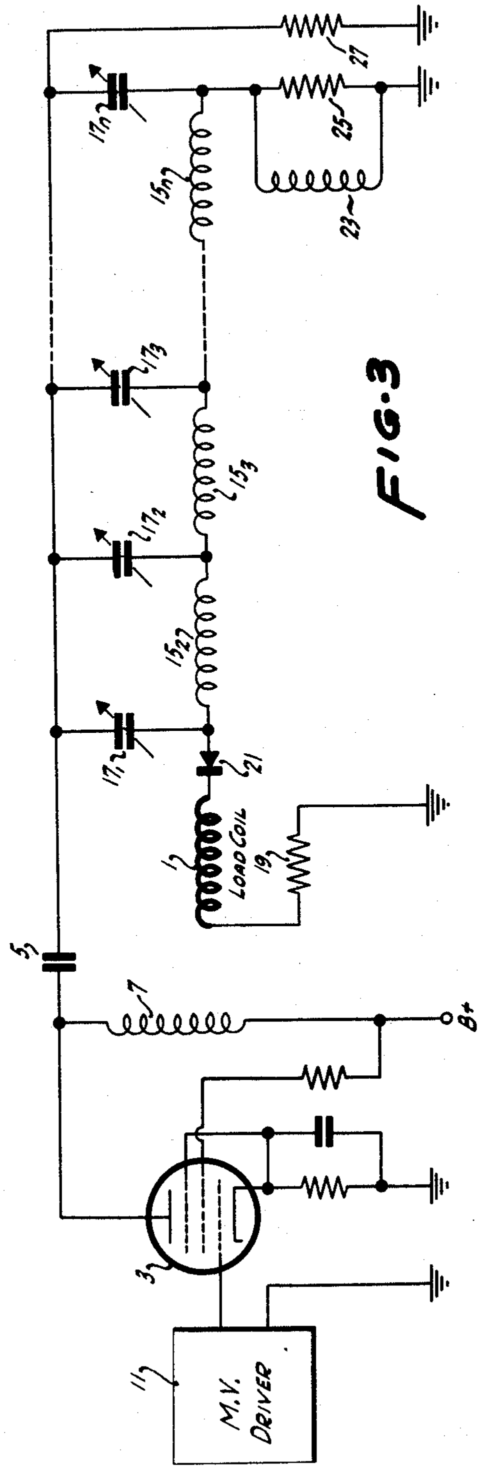
Fig. 3 is a schematic diagram of an embodiment of the invention as employed to develop unidirectional pulses comprising a square wave superposed on a direct current component in an inductive circuit.

In the arrangement of Fig. 3 it is the common connection to the condensers 17 that is connected directly to the anode of the pentode 3, while the inductor 1 is connected in the grounded side of the ladder network, in this case through a small resistor 19, the voltage drop across which can be used to monitor the performance of the circuit.

Additional elements included in the circuit, beyond those shown in Fig. 1, include a rectifier 21 connected in series with the inductive elements 1 and 15, an inductor 23 connected to ground and bridged by a resistor 25, and a resistor 27, of high ohmage, for establishing the D.C. level of the anode side of the network, which would otherwise be floating. The inductor 23 has a high impedance to all components of the square wave generated and the valve of the resistor 25 is also high, its function being to damp out any oscillations developed by shock excitation of the inductor 23. The rectifier 21 can be interposed in the circuit on either side of the coil 1. The rectifier prevents reversed flow of current through the coil 1. Its effect, when steady state conditions have been established in the circuit, is to add a direct current component equal in magnitude to the amplitude of the square wave current through the coil 1 so that instead of current values of +50 milliamperes (for example) flowing through the coil the current varies between zero and 100 milliamperes.

Figure 4:
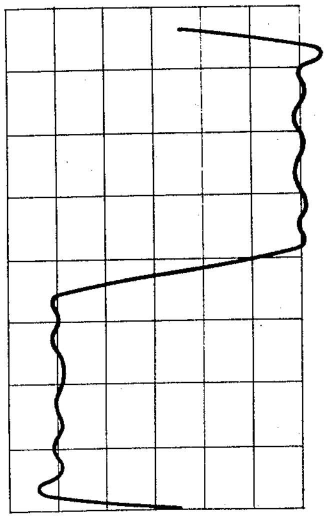
Fig. 4 is a copy of an oscillogram of the waveform developed by apparatus similar to that of Fig. 2 and employing five L-sections in the ladder network.

The result of either of these arrangements is illustrated by the waveforms shown in Fig. 4, which is copied from an oscillogram of the voltage developed across a resistor corresponding to resistor 19 of Fig. 3. The ladder network used employed five inductors and the waveforms illustrated therefore have as their dominant components the fundamental frequency of 10 kc. and the following odd harmonics from the 3rd through the 9th, giving a rise time of approximately 5 microseconds, the pulses being nominally 455 microseconds long. To obtain 100 milliampere pulses with this short a rise time through a 30 millihenry coil, driven directly from a single vacuum tube in a simple switching circuit, would require an effective voltage across the coil of 600 volts. Some additional voltage would be required to overcome the drop through the tube itself. During the portions of the wave after current flow through the coil is established in a simple switching circuit almost all of the 600 volts necessary to initiate the pulse would have to be dissipated within the tube giving a maximum dissipation of 60 watts and an average dissipation of 30 watts. Using the circuit of this invention the supply voltage to the tube need be only great enough to establish normal operating potentials across the tube, i.e., something of the order of 100 volts or slightly more, and since the current would be the same the dissipation need only be in the neighborhood of 5 watts. Therefore, ordinary radio receiver tubes may be employed instead of the high power tubes that would otherwise be required. The magnitude of the current flow is adjusted by regulation of the voltage applied from the multivibrator to the grid. Since the tube, when conducting, is essentially a "constant current" device whose output current is nearly independent of the instantaneous voltages on the anode, control of the grid voltage is sufficient to establish the magnitude of the pulses constituting the waveforms desired.

It will be seen that even with the small number of sections used in the ladder network the deviation from the desired square-waveform is relatively small, the amplitude of the slight oscillations at the peak and trough of the waves being only a small percentage of the amplitude of the waves themselves. By adding additional sections the rise time can be shortened and the amplitude of the oscillations decreased, but for many purposes, including that for which the apparatus illustrated was particularly designed, the approximation achieved is sufficiently accurate.

For example, the apparatus in which the example shown is employed uses the gyromagnetic ferrite to rotate the plane of polarization of a wave in a waveguide through 90 degrees between the two states of maximum and minimum magnetization. Two waveguides are connected to the output of the rotating guide, so oriented that the wave is directed through one waveguide in one condition and through a second waveguide in the other. The percent of transmission through either waveguide is proportional to the sine of the angle of the plane of polarization of the wave with respect to that guide. Although the degree of rotation does not vary linearly with respect to the current in the coil 1 it can be considered linear as a first approximation. Maximum transmission is hardly affected at all by the slight current oscillation while minimum transmission oscillates slightly as the coil current oscillates about its mean value. This latter oscillation may, in fact, actually improve the operation of the device, since it tends to overcome hysteresis in the ferrite, causing it to assume a magnetic state very nearly constant at the average magnetic state about which the minor oscillations occur.

It should be evident that numerous modifications are possible of the exact circuits shown. These are intended merely to be illustrative of the general principles involved and not as limitations upon the scope of the invention as defined in the claims which follow.

I claim:

1. Means for developing substantially square current-waveforms of substantially constant repetition frequency in an inductor, comprising a source of substantially constant-current output, a ladder network formed of inductive series elements and capacitive shunt elements, said inductor comprising the first of said series elements, and said ladder network having series-resonant impedance characteristics to said repetition frequency and a plurality of successive odd harmonics thereof, and means for effectively switching said ladder network in series with said source during alternate half cycles of said repetition frequency.

2. Means for developing substantially square-current waveforms of substantially constant repetition frequency in an inductor comprising a pentode, a ladder network connected in the output circuit of said pentode and formed of inductive series elements and capacitive shunt elements, said inductor being the first of said series elements and said ladder network having series-resonant impedance characteristics to said repetition frequency and a plurality of successive odd harmonics thereof, and means connected to a control circuit of said pentode for supplying thereto a square voltage wave of said repetition frequency.

3. Means for developing substantially square current-waveforms of constant repetition frequency in an inductance comprising a load circuit consisting of a plurality of inductors connected in series with said inductance and a plurality of condensers bridged across said load circuit following said inductance and each of said inductors to form a ladder network of L sections connected in cascade, said network having a plurality of resonant frequencies including said repetition frequency and successive odd integral multiples thereof, and a supply circuit connected to said ladder network comprising a source of substantially constant current and switching means for connecting said source to and disconnecting said source from said load circuit at said repetition frequency.

References Cited in the file of this patent

UNITED STATES PATENTS

| | | |
|---|---|---|
| 2,149,077 | Vance | Feb. 28, 1939 |
| 2,299,571 | Dome | Oct. 20, 1942 |
| 2,461,321 | Guillemin | Feb. 8, 1949 |
| 2,837,638 | Frink | June 3, 1958 |